(12) United States Patent
Kobayashi et al.

(10) Patent No.: US 8,517,648 B2
(45) Date of Patent: Aug. 27, 2013

(54) LOAD-CARRYING PLATFORM STRUCTURE

(75) Inventors: Takeshi Kobayashi, Saitama (JP); Nobutaka Ban, Saitama (JP); Yukinori Kawaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1139 days.

(21) Appl. No.: 11/727,800

(22) Filed: Mar. 28, 2007

(65) Prior Publication Data

US 2007/0231101 A1    Oct. 4, 2007

(30) Foreign Application Priority Data

Mar. 31, 2006    (JP) .................................. 2006-096580

(51) Int. Cl.
*B60P 7/08*    (2006.01)

(52) U.S. Cl.
USPC ............................ 410/109; 410/106; 410/112

(58) Field of Classification Search
USPC ................. 410/106, 109, 110, 112, 113, 116; 298/17 R; 224/403, 560, 568; 248/499
See application file for complete search history.

(56) References Cited

U.S. PATENT DOCUMENTS

| 2,051,381 | A | * | 8/1936 | Kivlin |
| 2,559,240 | A | * | 7/1951 | Wiggin .......................... 410/114 |
| 2,623,477 | A | * | 12/1952 | Tuttle ............................. 410/112 |
| 2,660,130 | A |   | 11/1953 | Johnson |
| 5,419,603 | A | * | 5/1995 | Kremer et al. |
| 6,113,328 | A | * | 9/2000 | Claucherty ................... 410/106 |

FOREIGN PATENT DOCUMENTS

| JP | 1-215683 A | 8/1989 |
| JP | 5-32254 U  | 4/1993 |

* cited by examiner

*Primary Examiner* — Stephen Gordon
(74) *Attorney, Agent, or Firm* — Birch, Stewart, Kolasch & Birch, LLP

(57) ABSTRACT

To provide a load-carrying platform structure which allows loading irrespective of the kind or shape of a load, reliably secures the load onto the load-carrying platform, and does not cause a decrease in the full load capacity. In a structure in which a frame includes a load-carrying platform, and wall portions are provided in the outer periphery of the loading portion of the load-carrying platform with recesses being provided in the inner wall surfaces of the wall portions. Hooks for securing the load in place are provided in the respective recesses so as to fit within the inner wall surfaces of the wall portions.

12 Claims, 10 Drawing Sheets

LOAD-CARRYING PLATFORM STRUCTURE

CROSS-REFERENCE TO RELATED APPLICATIONS

The present application claims priority under 35 USC 119 to Japanese Patent Application No. 2006-096580 filed on Mar. 31, 2006 the entire contents of which are hereby incorporated by reference.

BACKGROUND OF THE INVENTION

1. Field of the Invention

The present invention relates to a load-carrying platform structure for carrying a load.

2. Description of Background Art

A MUV (Multi Utility Vehicle) vehicle is commonly known as a seat type vehicle equipped with a load-carrying platform. In a vehicle of this type, a load is placed on the load-carrying platform. However, in the case of a small-sized cargo (bulk cargo) or the like, depending on the kind or shape of the load, the loading may become difficult unless a wall portion is provided. Accordingly, there has been proposed a structure in which a side flap portion is detachably provided in the outer periphery of the loading portion of a load-carrying platform so as to allow loading irrespective of the shape of the load. See, for example, JP-A No. H01-215683.

On the other hand, in a construction according to the related art, even when a load is placed inside the wall portion of the load-carrying platform, the load may roll around on the load-carrying platform in situations when the vehicle is traveling at high speed in rough terrain. To overcome this problem, there has been proposed a technique in which a hook portion is provided on the floor surface of the load-carrying platform of a large-sized truck, and a rope is hooked onto this hook to thereby secure the load in place. See, for example, JP-U No. H05-32254.

However, although the construction of the related art disclosed in JP-U No. H05-32254 proves effective when applied to a vehicle such as a large-sized truck with a load-carrying platform having a large floor surface, since the floor surface is raised. In the case of a vehicle having a load-carrying platform with a small load capacity, the loading surface is reduced, and also the number of parts increase, thus producing an increase in cost.

Further, in the case of a vehicle with a narrow load-carrying platform, for example, loading is easily performed by hooking a rope or the like onto a plurality of hooks to secure the load in place. However, when a plurality of hooks project on the load-carrying platform or on the inner wall surface of the load-carrying platform, this leads to a decrease in full load capacity.

SUMMARY AND OBJECTS OF THE INVENTION

In view of the above, to address the above-mentioned problems associated with the related art, it is an object of an embodiment of the present invention to provide a load-carrying platform structure which allows loading irrespective of the kind or shape of a load, reliably secures the load onto the loading surface, and does not cause a reduction in full load capacity.

According to an embodiment of the present invention, there is provided a load-carrying platform structure in which a frame includes a load-carrying platform and a wall portion is provided in an outer periphery of a loading portion of the load-carrying platform, the load-carrying platform structure includes a recess provided in an inner wall surface of the wall portion and a hook portion provided in the recess, the hook portion being sized so as to fit within the inner wall surface of the wall portion, and the hook portion securing a load in place.

According to this construction, it is possible to prevent the loaded cargo from coming into interference with the hook portion.

Further, the recess may be provided in a lower portion of the wall portion, and the hook may be attached onto the frame.

According to this construction, by providing the hook portion to the frame, it is possible to form a frame portion of high strength.

Further, the hook may be formed by punching an inner wall surface material forming the wall portion.

According to this construction, the hook portion can be formed simply by punching the inner wall surface material.

Further, the wall portion may have a stepped portion formed in the inner wall surface.

According to this construction, since a stepped portion is formed by recessing the inner wall surface of the wall portion, a long object may be loaded so as to be fitted into this stepped portion. Further, an enhanced strength can be achieved by increasing the modulus of section of the wall portion.

According to an embodiment of the present invention, a recess is formed in the inner wall surface of the wall portion, and a hook portion that does not project beyond the inner wall surface is provided inside this recess, whereby upon loading cargo onto the load-carrying platform, this cargo contacts the inner wall surface and hence does not come into interference with the hook portion. Further, the hook does not become obtrusive during the cargo loading operation. Further, since the recess is formed by recessing the wall portion, no decrease occurs in the load capacity of an existing load-carrying platform. Further, a rope or the like is hooked onto the hook portion, thereby making it possible to reliably secure the load in place with this rope. Furthermore, since a stepped portion is formed in the inner wall surface, the load capacity can be enlarged, and also the strength of the wall portion can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(a) and 9(b) are enlarged views showing a state with a rope hooked on a hook portion 58 shown in FIG. 7, of which FIG. 9(a) is a front view, and FIG. 9(b) is a sectional view taken along the line 9-9 of FIG. 9(a); and FIGS. 10(a) to 10(c) are enlarged views of a hook portion 72 shown in FIG. 7, of which FIG. 10(a) is a front view, FIG. 10(b) is a sectional view taken along the line 10-10 of FIG. 10(a), and FIG. 10(c) is a perspective view.

DETAILED DESCRIPTION OF THE PREFERRED EMBODIMENTS

A load-carrying platform structure according to an embodiment of the present invention will now be described with reference to the drawings.

Figure 1:
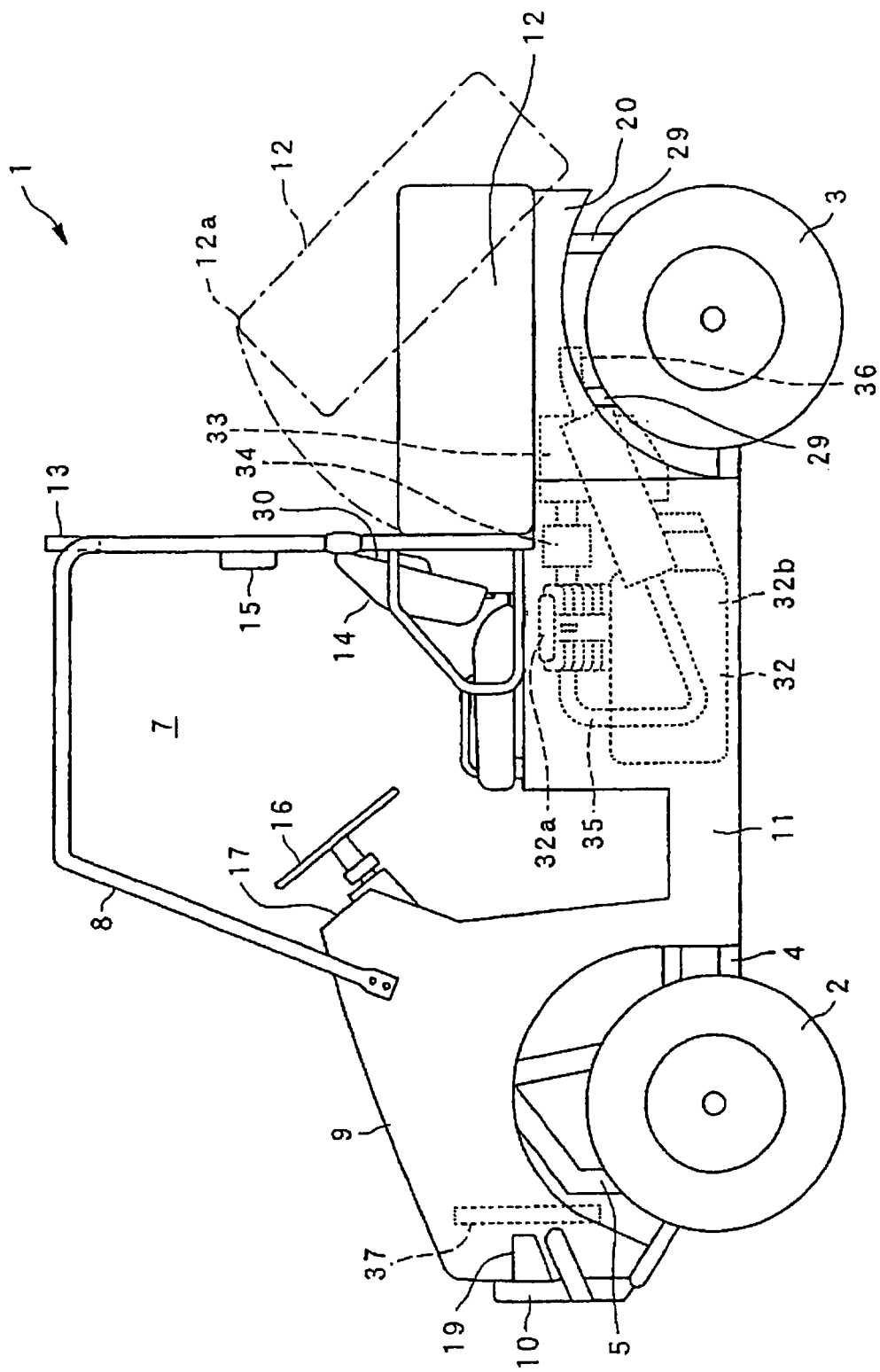
FIG. 1 is a side view of a vehicle including a load-carrying platform structure according to an embodiment of the present invention.

As shown in FIG. 1, a MUV vehicle 1 is a four-wheel vehicle capable of driving over rough terrain or the like and having two front wheels 2 and two rear wheels 3 provided on the front and rear sides, respectively.

Figure 2:
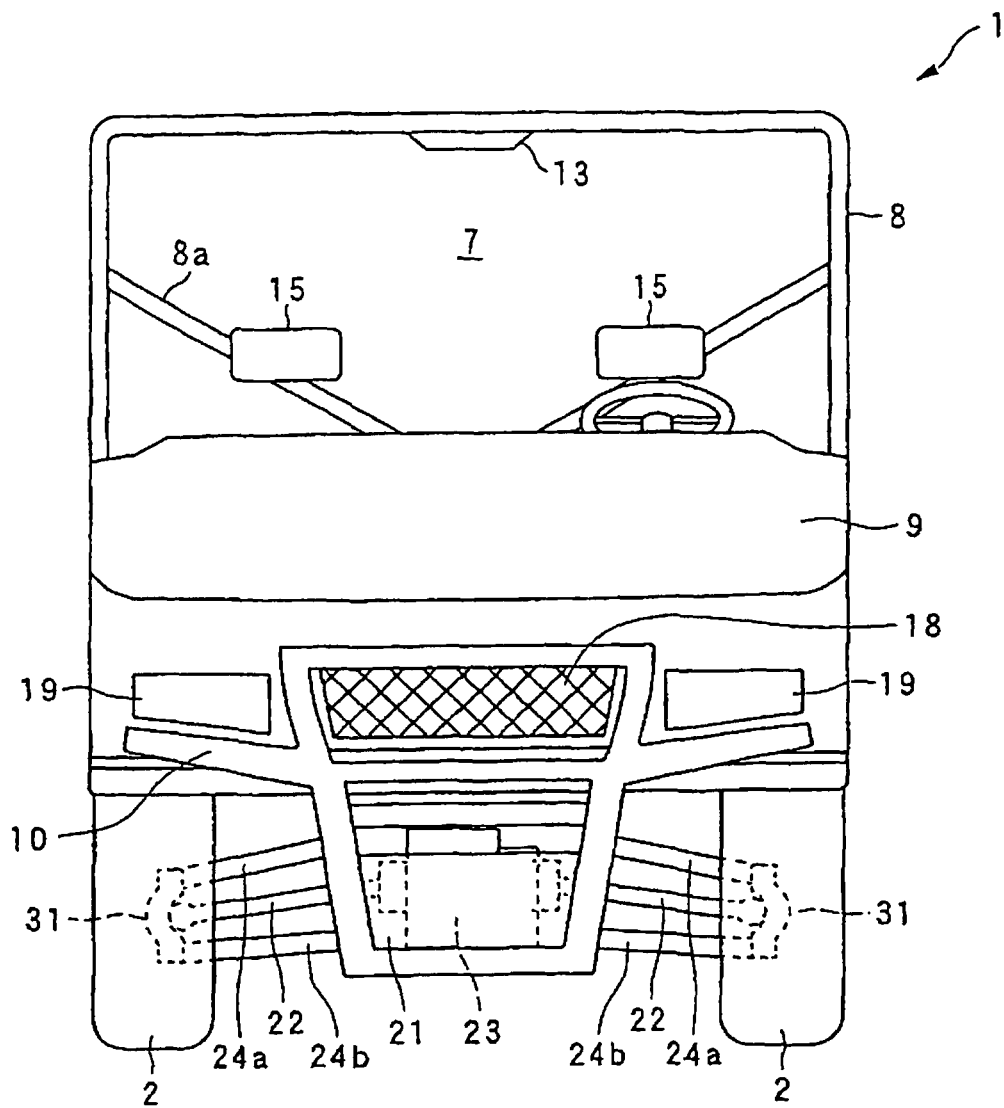
FIG. 2 is a front view of the vehicle shown in FIG. 1.

As shown in FIGS. 1 and 2, at the front portion of the vehicle 1, there are provided a bonnet 9 attached by means of a hinge or the like so as to freely open and close in the vertical direction, a front grille 18 for taking in air during the operation of the vehicle, a headlight 19 arranged on either side of the front grille 18, and a carrying pipe 10 for protecting the front-side portion of the vehicle.

As shown in FIG. 2, as seen from the front side of the vehicle, the carrying pipe 10 is formed substantially in the shape of the number 8, and extends laterally from either side of the 8-shaped configuration to the portion below the headlight 19. The front grille 18 is exposed on the front surface of the vehicle through the opening in the upper side of the 8-shaped configuration of the carrying pipe 10. As shown in FIG. 1, arranged on the back side of the front grille 18 is a radiator 37 for cooling the cooling water with an air flow from the front grille 18.

Further, a skid plate 21 is provided in the opening in the lower side of the 8-shaped configuration so as to occupy the lower half of this opening. A front-wheel final reduction gear 23 is arranged on the back side of the skid plate 21. A drive shaft 22 for driving the front wheels 2 is coupled to the final reduction gear 23. Further, upper and lower suspension arms 24a, 24b are coupled to each of the front wheels 2 via a knuckle 31. The proximal end portions of the suspension arms 24a, 24b are attached to front frames 5 that will be described later in detail.

Figure 4:
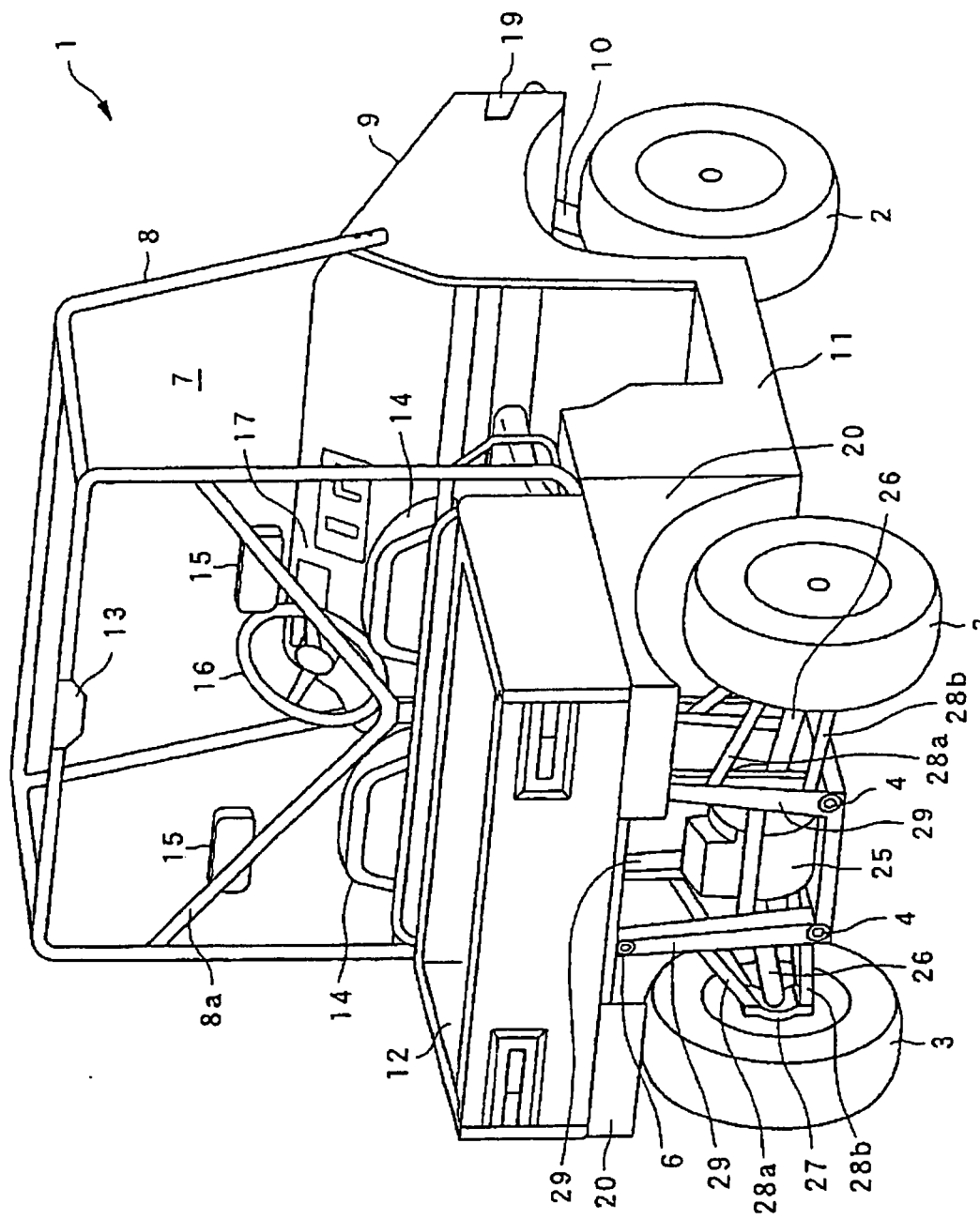
FIG. 4 is a perspective view, as seen diagonally from the right rear, of the vehicle shown in FIG. 1.

As shown in FIGS. 1 and 4, on either side portion of the vehicle 1, there are provided a body cover 11 that covers the side surface portion of the vehicle, and a fender 20 located on the vehicle rear side with respect to the vehicle cover 11. Further, the vehicle 1 is not provided with a door or the like, and a cab 7 located above the body cover 11 is only surrounded by a roll bar 8 assembled using a frame member.

Figure 3:
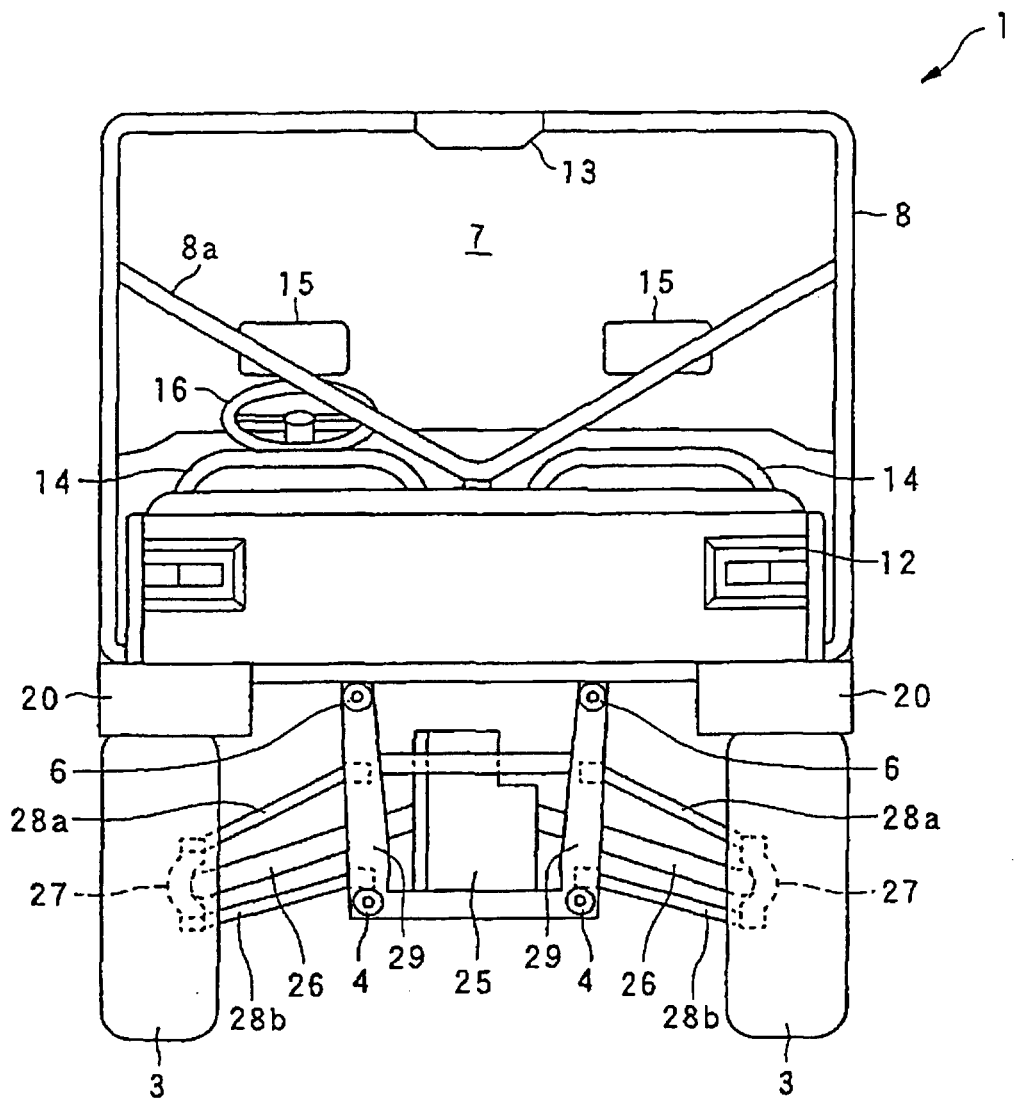
FIG. 3 is a rear view of the vehicle shown in FIG. 1.

As shown in FIGS. 1, 3, and 4, a load-carrying platform 12 for loading cargo is provided in the rear portion of the vehicle 1. The load-carrying platform 12 includes a rotary shaft (not shown) provided at a lower rear end portion. The front side portion of the load-carrying platform 12 can be lifted upward about this rotary shaft (see the load-carrying platform 12 indicated by the two-dot chain line in FIG. 1).

Further, in the rear portion of the vehicle 1, a rear-wheel final reduction gear 25 is arranged in the portion surrounded by lower frames 4 and upper frames 6 that will be described later in detail. A drive shaft 26 for driving the rear wheels 3 is coupled to the final reduction gear 25. Further, upper and lower suspension arms 28a, 28b are coupled to each of the rear wheels 3 via a knuckle 27. The proximal end portions of the suspension arms 28a, 28b are coupled to U-shaped brackets 29 vertically connecting between the lower frames 4 and the upper frames 6.

A stop lamp 13 that illuminates upon the actuation of the brake is mounted in an upper rear portion of the roll bar 8. The stop lamp 13 is positioned such that the mounting height of the stop lamp 13 is higher than the height of an upper end portion 12a of the load-carrying platform 12 at the time when the front side of the load-carrying platform 12 is lifted up. That is, the stop lamp 13 is placed at a position where it can be viewed from the rear of the vehicle 1 irrespective of the tilting state of the load-carrying platform 12.

The cab 7 is provided with two occupant seats 14 (which may be a bench seat as well) respectively arranged on the driver's seat side and on the passenger seat side with two headrests 15 arranged at positions above the occupant seats 14. A steering wheel 16 is positioned in front of the driver's seat. An instrument panel 17 is located further frontward with respect to the steering wheel 16 for covering the front surface portion while extending rearwardly towards the driver's seat and the passenger seat. The occupant seats 14 are fixed to a seat frame 30 mounted above the upper frames 6 which will be described later. Further, the headrests 15 are mounted onto a reinforcing frame 8a extending in a substantially V-shaped configuration (see FIG. 3) from the roll bar 8.

As shown in FIG. 1, an engine 32 is provided below the cab 7. More specifically, the engine 32 is arranged below the intermediate position between the driver's seat and the passenger seat with respect to the vehicle width direction. The engine 32 mainly includes a cylinder head 32a and a crankcase 32b located below the cylinder head 32a, with an air cleaner 33 being disposed to the rear of the engine 32. The air cleaner 33 is connected to the rear side of the cylinder head 32a via a throttle body 34 (which may be a carburetor as well). Further, an exhaust pipe 35 is connected to the front side of the cylinder head 32a. The exhaust pipe 35 is drawn forward from the cylinder head 32a and then further routed downwardly toward the crankcase 32b side before extending diagonally upwardly toward the rear of the vehicle. A muffler 36, disposed in the rear of the vehicle, is connected to the exhaust pipe 35. Further, a crankshaft is arranged inside the crankcase 32b so as to extend in the longitudinal direction of the vehicle. Driving force is transmitted to the front wheels 2 by means of a drive shaft (not shown) extending forward from the crankcase 32b, and driving force is also transmitted to the rear wheels 3 by means of a drive shaft (not shown) extending rearwardly from the crankcase 32b. Further, the engine 32 is connected via a piping (not shown) to the radiator 37 (see FIG. 1) provided on the front side of the vehicle.

Figure 5:
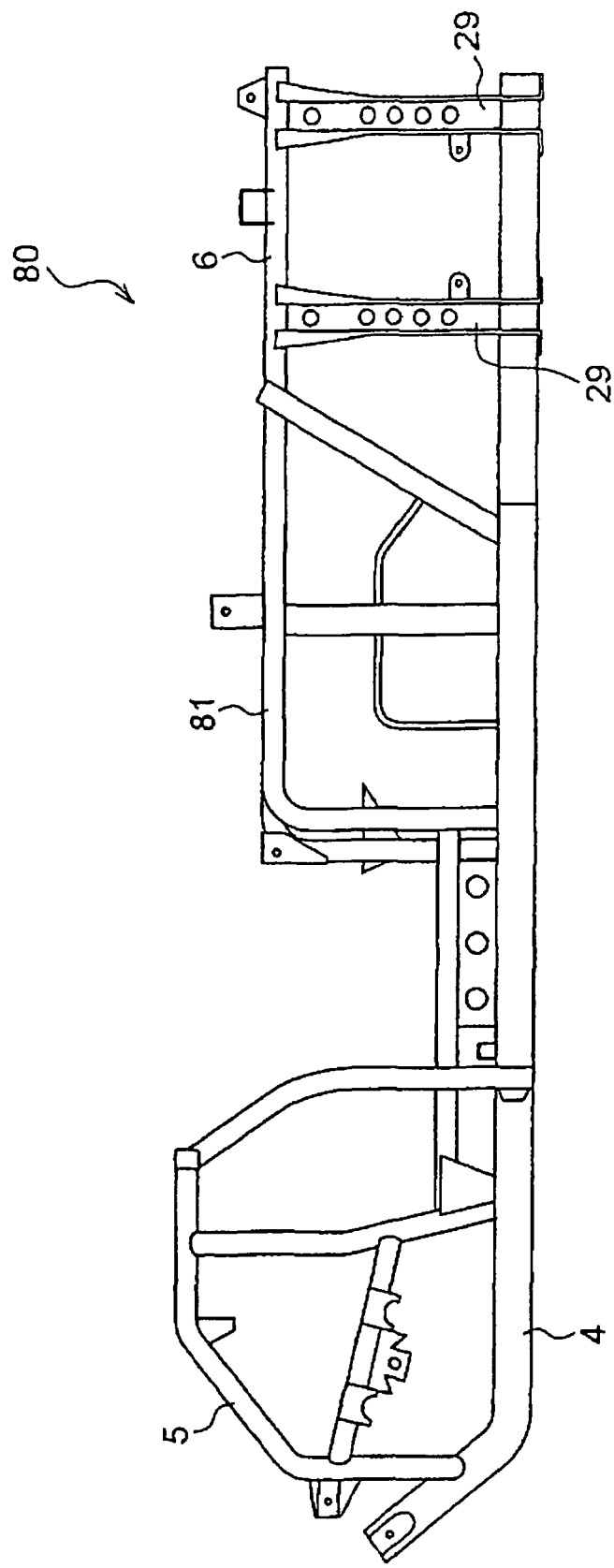
FIG. 5 is a side view showing the body frame structure of the vehicle shown in FIG. 1.
Figure 6:
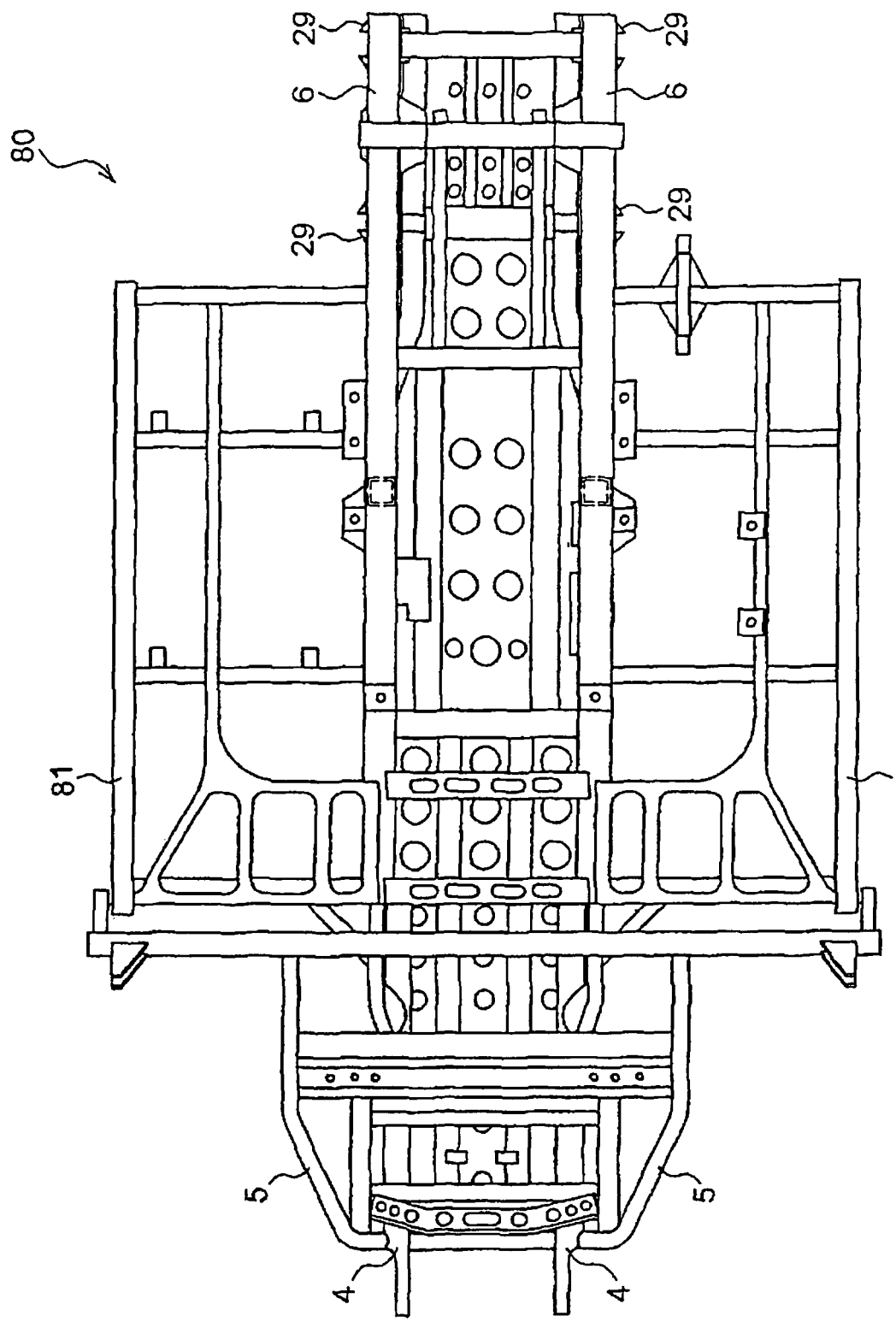
FIG. 6 is a plan view of FIG. 5.

FIG. 5 is a side view of a body frame as a strength member of the vehicle 1 as seen from the side portion of the vehicle (in the same direction as FIG. 1), and FIG. 6 is a plan view thereof.

A body frame 80 mainly includes the two longitudinally extending lower frames 4 at the bottom portion of the vehicle, the front frames 5 fixed to the lower frames 4 and constituting the front portion of the vehicle. The upper frames 6 are located above the lower frames 4 so as to extend along the lower frames 4. Side frames 81 are assembled by forming a plurality of frame members in a substantially lattice-like configuration on both side portions of the lower frames 4 and upper frames 6. The lower frames 4 and the upper frames 6 are integrally connected with each other by means of vertically extending frame members (such as the brackets 29).

Figure 7:
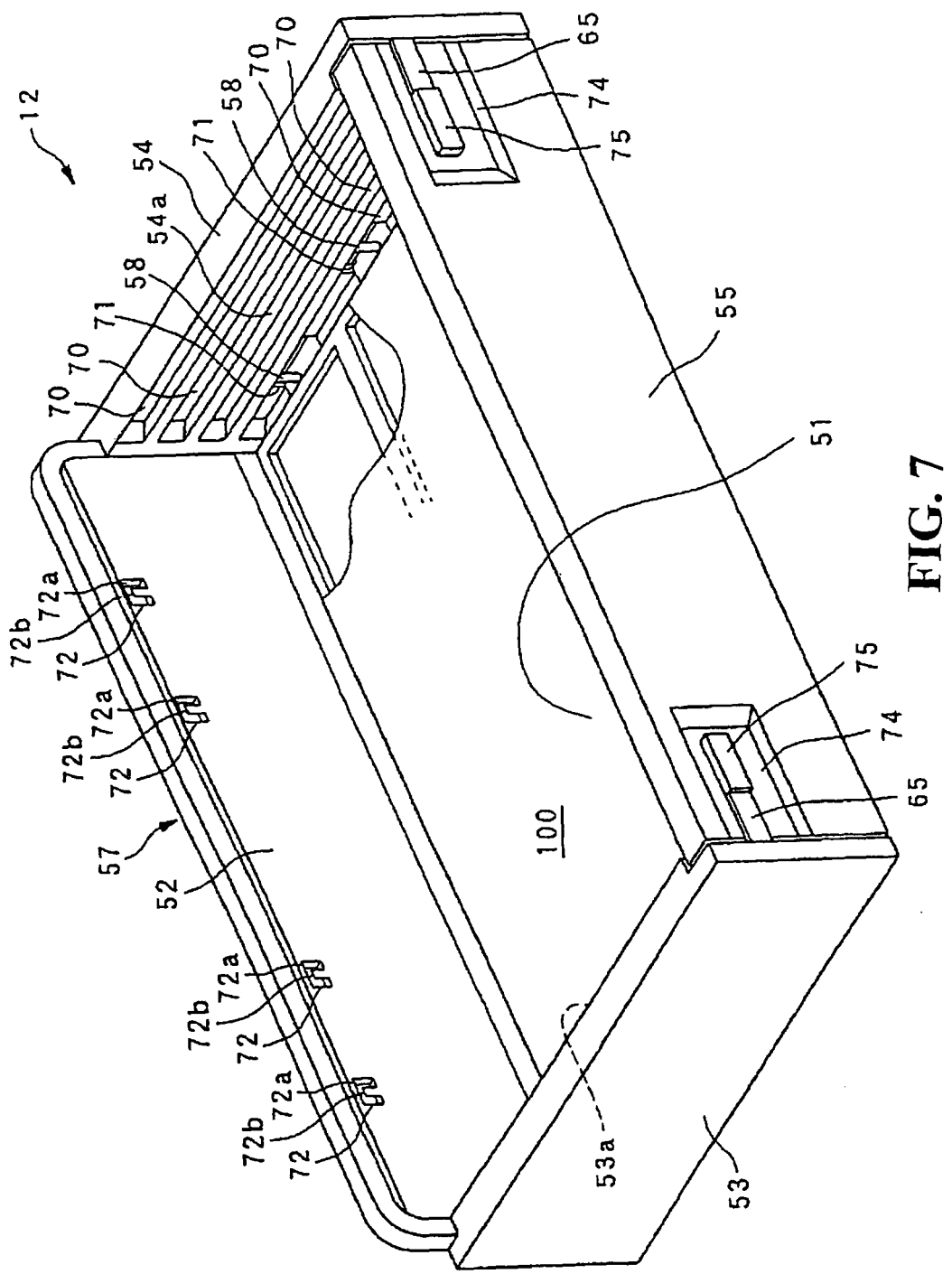
FIG. 7 is a perspective view of a load-carrying platform used in the load-carrying platform structure according to the embodiment of the present invention.

As shown in FIG. 7, the load-carrying platform 12 has a box-like configuration that is open at the top. The load-carrying platform 12 includes a floor portion 51 forming the bottom surface, a front side wall portion 52 forming a side wall portion on the front side of the vehicle, a left side wall portion 53 and a right side wall portion 54 that form side wall portions on the side portions of the vehicle, and a rear side wall portion 55 that forms a side wall portion on the rear side of the vehicle. Further, the floor portion 51 and the wall portions 52, 53, 54, 55 constituting the load-carrying platform 12 are assembled onto a frame portion 56 shown in FIG. 8 to form a cargo-loading portion 100 on which cargo can be loaded. While the floor portion 51 and the wall portions 52, 53, 54, 55 are each formed of a resin material, alternatively, they may be formed as a plate-like member made of steel.

Figure 8:
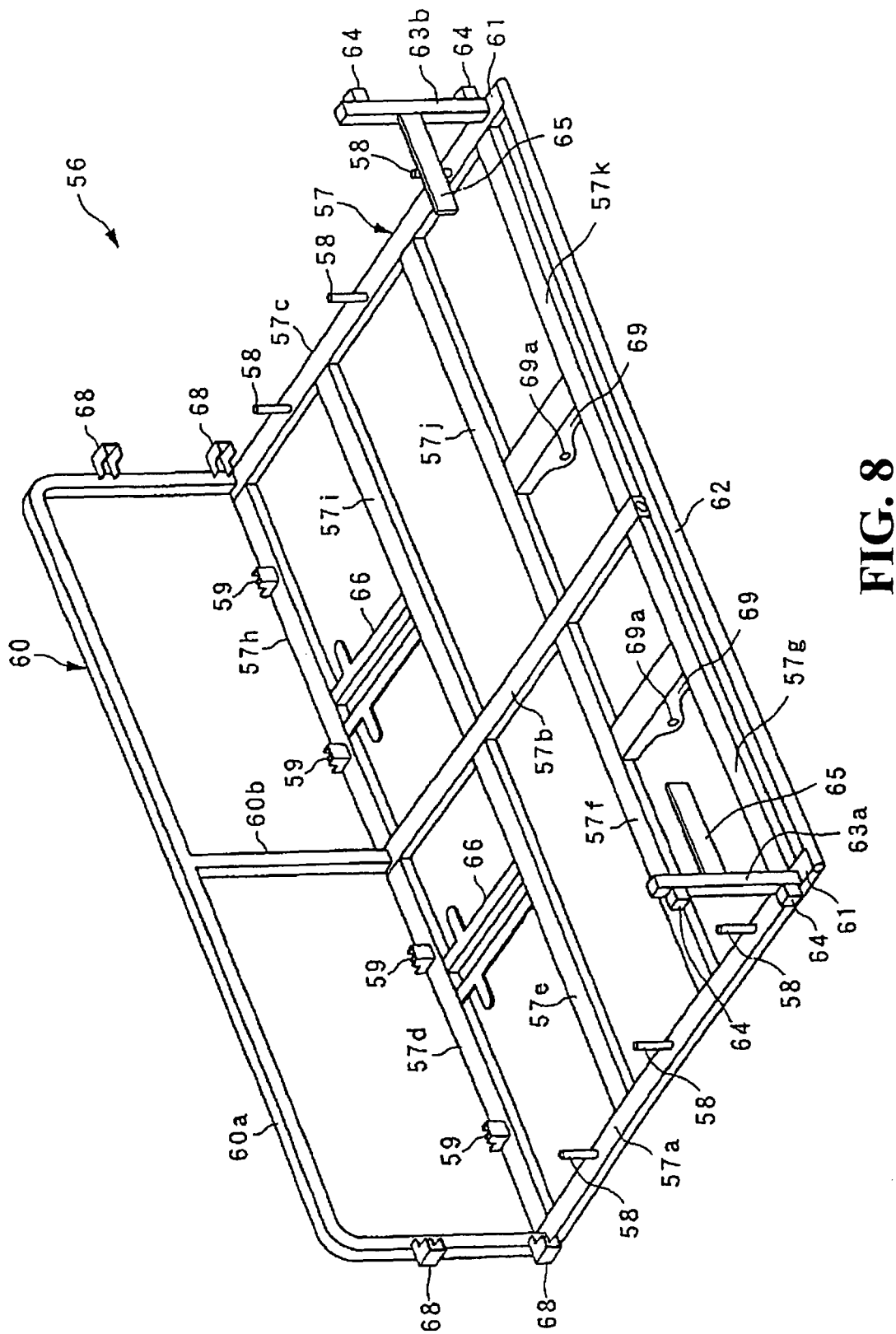
FIG. 8 is a perspective view of a frame portion constituting the framework of the load-carrying platform shown in FIG. 7.

As shown in FIG. 8, a bottom frame portion 57 constituting the base of the load-carrying platform 12 includes longitudinal frames 57a, 57b, 57c extending in the longitudinal direction of the vehicle, and lateral frames 57d to 57k connecting between the longitudinal frames 57a, 57b, 57c in the lateral direction of the vehicle. These frames are assembled into a lattice-like configuration. Square pipes made of steel, for example, are used for the frames 57a to 57k.

Three upwardly extending hook portions 58 are provided on the upper surface of each of the longitudinal frames 57a and 57c. The hook portions 58 are arranged at substantially equal intervals in the extending direction of the longitudinal frames 57a and 57c. Each of the hook portions 58 is formed in the shape of a round bar and allows a rope or the like to be hooked from the distal end portion of the hook portion. Each of the hook portions 58 may be formed by a stud having a screw portion on its outer peripheral surface, with an anti-detachment member being attached with a nut or the like after hooking a rope, or may have at the distal end of the hook portion 58 a locking portion on which the rope can be hooked.

Further, two mounting fittings 59 for mounting the front side wall portion 52 are provided on the upper surface of each of the lateral frames 57d, 57h located on the front side of the vehicle.

A front frame portion 60 located on the front side of the front side wall portion 52 of the load-carrying platform 12 is assembled by a U-shaped frame 60a extending in the vertical direction of the vehicle, and a vertical frame 60b extending in the vertical direction of the vehicle. Square pipes made of steel, for example, are used for the frames 60a, 60b.

When assembled, the U-shaped frame 60a has a substantially U-shaped configuration whose lower side is open, and its both lower ends are fixed onto the upper surfaces at the front end portions of the longitudinal frames 57a and 57c. The vertical frame 60b extends upwardly from the upper surface at the front end portion of the longitudinal frame 57b toward the U-shaped frame 60a. Further, two mounting fittings 68 are provided on the rear surface of each of two frame portions of the U-shaped frame 60a which extend in the vertical direction of the vehicle.

Support frames 61 that extend to the rear of the vehicle are respectively provided at the rear ends of the longitudinal frames 57a and 57c. A pivot shaft 62 extending in the lateral direction of the vehicle is mounted between the two support frames 61. The lower side portion of the rear side wall portion 55 is mounted onto the pivot shaft 62. The rear side wall portion 55 is thus mounted so as to be pivotable about the pivot shaft 62.

Further, column frames 63a, 63b are respectively provided on the upper surfaces at the rear ends of the longitudinal frames 57a, 57c so as to extend upward from these upper surfaces. The column frames 63a, 63b are formed by square pipes. Two mounting fittings 64 that project outward in the lateral direction of the vehicle are respectively provided in the upper and lower side surfaces of the column frames 63a, 63b. The left side wall portion 53 and the right side wall portion 54 are mounted onto the frame portion 56 by means of the mounting fittings 64 and the mounting fittings 68, respectively.

Further, a locking fitting 65 is provided on the inner surface of each of the column frames 63a, 63b.

Mounting members 66 allowing the mounting of the floor portion 51 are respectively provided between the lateral frames 57d and 57e, and between the lateral frames 57h and 57i. Support members 69 are respectively mounted between the lateral frames 57f and 57g, and between the lateral frames 57j and 57k. The support members 69 each constitute a pivot about which the load-carrying platform 12 pivots with respect to the vehicle body side. Each of the support members 69 includes a pivot hole 69a. The pivot hole 69a is attached to a pivot shaft (not shown) provided on the vehicle body side. This construction allows the load-carrying platform 12 to pivot about the pivot shaft as indicated by the two-dot chain line in FIG. 1.

Returning to FIG. 7, a description will be given of the assembled state of the load-carrying platform 12.

Figure 9A:
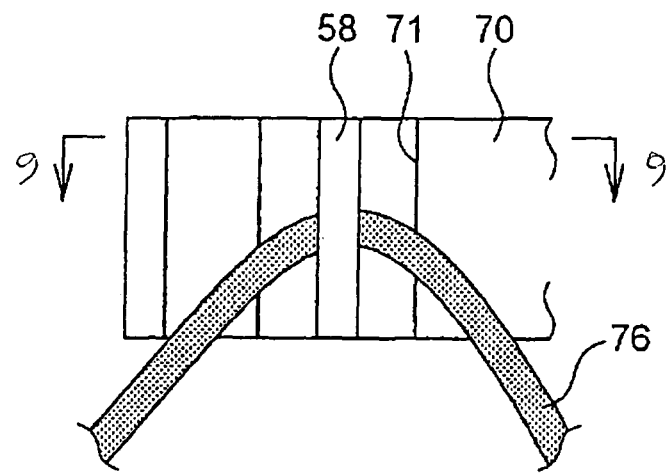
Figure 9B:
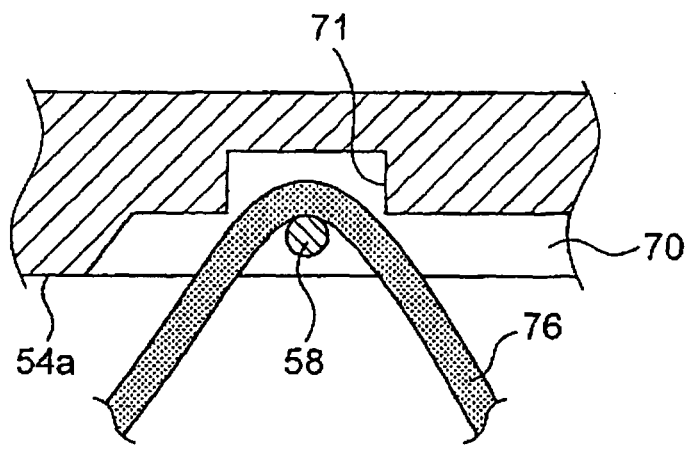

As shown in FIG. 7, the left side wall portion 53 and the right side wall portion 54 each have a predetermined thickness in the width direction of the vehicle. In each of inner wall surfaces 53a, 54a of the wall portions 53, 54 facing the cargo-loading portion 100, there are formed a plurality of grooves (stepped portions) 70 extending in the longitudinal direction of the vehicle, and three recesses 71 are formed so as to surround the portions where the hook portions 58 of the frame portion 56 project from the floor portion 51. As shown in FIG. 9(b), each recess 71 is recessed toward the outer side of the vehicle relative to the surface on the back side of the groove 70. Further, the hook portion 58 extends continuously from the lower surface to the upper surface in the interior of the groove 70. According to this construction, as shown in FIGS. 9(a) and 9(b), a rope 76 can be hooked so as to be wrapped on the hook member 58 of the recess portion 71. It should be noted that of the three recesses 71, two recesses 71 that can be visually observed are shown in FIG. 7.

Figure 10A:
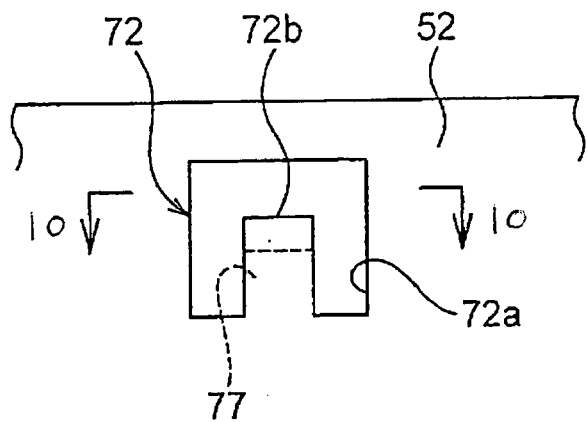
Figure 10B:
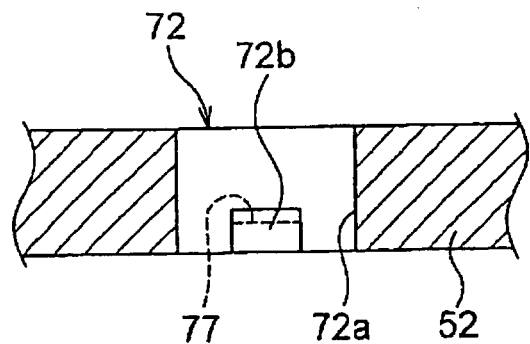
Figure 10C:
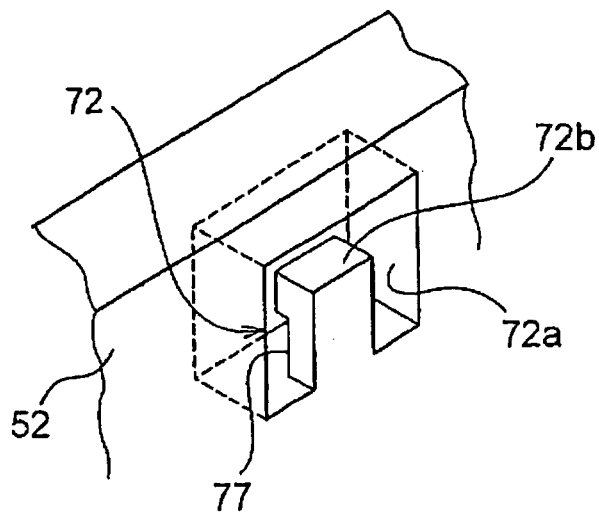

An upper portion of the front side wall portion 52 is provided with four hook portions 72 that are spaced apart from each other in the width direction of the vehicle. Further, a plurality of ribs (stepped portions) (not shown) that project toward the cargo-loading portion 100 side may be formed on an inner surface 52a of the front side wall portion 52. As shown in FIGS. 10(a) to 10(c), a U-shaped through-hole 72a is provided in the inner wall surface material of the front side wall portion 52 so as to extend through the thickness of the inner wall surface material. A hook portion 72b on which a rope or the like can be hooked is thus formed so as to project upwardly. Further, as shown in FIGS. 10(a) to 10(c), a recess 77 is formed in a lower portion of the rear surface of the hook portion 72b so that the rope 76 hooked into the recess 77 is not readily dislodged upwardly The rear surface of the rear side wall portion 55 has a groove 74 formed at either end in the width direction of the vehicle. An engagement fitting 75 is provided in the groove 74. The locking fitting 65 of the frame portion 56 engages with the engagement fitting 75, thereby locking the pivotable rear side wall portion 55 to keep the load-carrying platform 12 in the closed state.

The wall portions 52 to 55 are detachably mounted onto the frame portion 56 by means of bolts or the like (not shown). Accordingly, the respective wall portions can be readily replaced as required.

Next, the operation of the load-carrying platform structure according to an embodiment of the present invention will be described.

For example, when cargo is placed on the corner of the load-carrying platform 12 at a right front portion of the vehicle, the cargo comes into contact with the upper surface of the floor portion 51, an inner surface 54a of the right side wall portion 54, and the front side wall portion 52. Further, the cargo may come into contact with the plurality of ribs (not shown) that project toward the cargo-loading portion 100 side. Even when cargo is loaded so as to contact the respective surfaces in this way, the cargo does not interfere with the hook portions 58, 72. Likewise, even when cargo is loaded so as to contact another inner wall surface, no interference occurs between the hook portions 58, 72 and the cargo.

Further, after loading cargo onto the load-carrying platform 12, for example, the rope 76 or the like may be hooked onto the hook portion 58, 72 so that the loaded cargo can be secured in place with the rope.

In the load-carrying platform structure according to the embodiment of the present invention, the recesses 71 are formed in the inner wall surface 53a of the left side wall portion 53 and in the inner wall surface 54a of the right side wall portion 54, and the hook portions 58 are provided inside the respective recesses 71. Accordingly, the loaded cargo contacts the inner wall surfaces 53a, 54a and thus does not come into interference with the hook portions 58. The hook portions 58 thus do not become obtrusive during the cargo loading operation. Further, since the wall portions 53, 54 are recessed to form the recesses 71, the load capacity of the load-carrying platform does not decrease. Further, the rope 76 or the like can be hooked onto the hook portions 58 to reliably secure the loaded cargo in place with this rope.

Likewise, by providing the front side wall portion 52 with the hook portions 72, the loaded cargo contacts the inner wall surface 52a and thus does not come into interference with the hook portions 72. Therefore, the hook portions 72 do not become obtrusive during the item loading operation. Further, since the ribs (not shown) project from the inner wall surface 52a, it is possible to prevent the item from coming into interference with the hook portions 72. Further, a rope or the like can be hooked onto the hook portion 72 to reliably secure a load in place with this rope, without causing a decrease in the load capacity of the load-carrying platform 12.

While an embodiment of the present invention has been described above, the present invention is not limited to the above-mentioned embodiment but various modifications and alterations can be made on the basis of the technical idea of the present invention.

For example, while in this embodiment the description is directed to the load-carrying platform of a MUV vehicle that is a seat type vehicle, the structure of this embodiment can be applied to any type of vehicle having a load-carrying platform.

Further, while the above description is directed to a case in which the hook portion 58 projects upward from the floor portion 51, it is also possible to form recesses at the center portion in the vertical direction of the left side wall portion 53 or right side wall potion 54, with the hook portions 58 projecting from the bottom surfaces of the recesses. Further, the projecting direction of the hook portions 58 is not limited to the upward direction but the hook portions 58 can be made to project in any direction. Likewise, the hook portions 72 may not necessarily be provided in an upper portion of the front side wall portion 52 but may be provided at the center portion or in a lower portion in the vertical direction of the vehicle.

Further, while the hook portions 58 are provided in the left side wall portion 53 and the right side wall portion 54 in this embodiment, this should not be construed restrictively. It is also possible to provide the hook portions 58 in the front side wall portion 52 or rear side wall portion 55. Likewise, the hook portions 72 may not necessarily be provided in the front side wall portion 52 but may be provided in the left side wall portion 53, the right side wall portion 54, and the rear side wall portion 55.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A load-carrying platform structure in which a frame includes a load-carrying platform and a wall portion is provided in an outer periphery of a loading portion of the load-carrying platform, comprising:
    a recess recessing an inner wall surface of the wall portion and provided in the wall portion; and
    a hook portion provided in the recess, the hook portion being sized so as to not project beyond the inner wall surface of the wall portion, and the hook portion securing a load in place, wherein the hook portion is formed by punching an inner wall surface material forming the wall portion.

2. The load-carrying platform structure according to claim 1, wherein the recess is provided in a lower portion of the wall portion, and the hook portion is attached onto the frame.

3. The load-carrying platform structure according to claim 1, wherein the top surface of the recess and the bottom surface of the recess face toward each other and face toward the recess.

4. The load-carrying platform structure according to claim 1, wherein the wall portion has a stepped portion formed in the inner wall surface.

5. The load-carrying platform structure according to claim 1 claim 1, wherein a plurality of additional recesses are provided on opposite sides of said load-carrying platform for securing a load thereto.

6. The load-carrying platform structure according to claim 5, wherein a plurality of additional hook portions are provided, wherein each one of the additional hook portions are located within a corresponding one of the additional recesses for securing a load thereto.

7. The load-carrying platform structure according to claim 1, wherein the recess and the hook portion are provided adjacent a lower portion of said inner wall surface.

8. The load-carrying platform structure according to claim 7, further including a second hook portion being formed at an upper surface of the inner wall surface for securing a load thereto.

9. The load-carrying platform structure according to claim 8, wherein the second hook portion is formed by an aperture in the upper surface of the inner wall surface with an opening being provided with an upwardly projecting hook portion being formed to extend upwardly within said opening.

10. The load-carrying platform structure according to claim 1, wherein the inner wall surface provides a flat surface that does not interfere with a load being secured thereto.

11. The load-carrying platform structure according to claim 1, wherein when the hook portion continuously extends from the top surface of the recess to the bottom surface of the recess, the top surface of the recess and the bottom surface of the recess define the largest height of the recess.

12. The load-carrying platform structure according to claim 1, wherein when the hook portion continuously extends from the top surface of the recess to the bottom surface of the recess, the entire hook portion continuously extends from the top surface of the recess to the bottom surface of the recess and ends at the bottom surface of the recess.

* * * * *